Oct. 28, 1941.  E. C. HORTON  2,260,905
WIPER BLADE MOUNTING
Filed Aug. 2, 1938
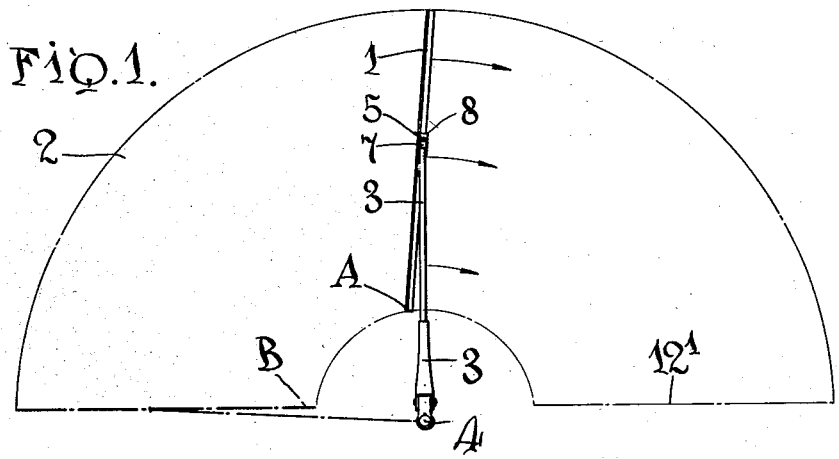
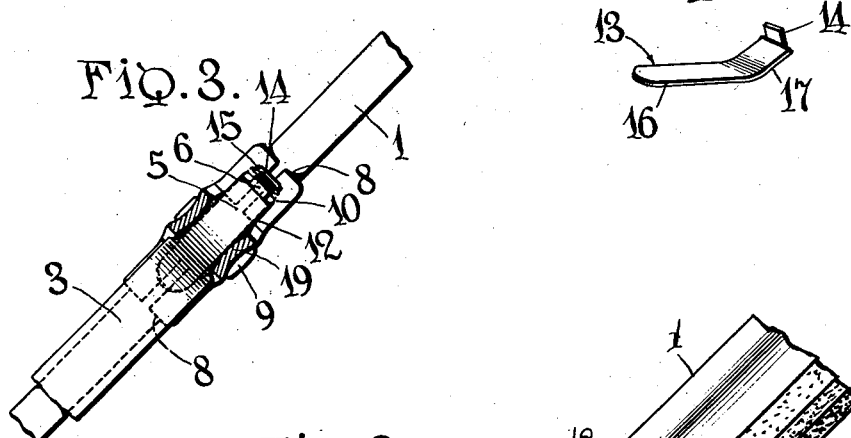
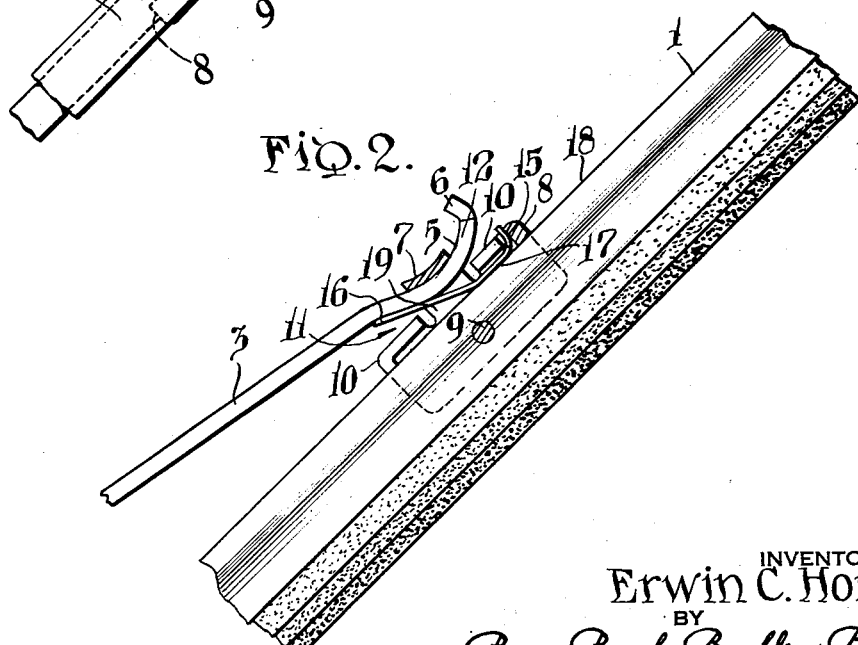
INVENTOR
Erwin C. Horton,
BY
Beau, Brooks, Buckley & Beau.
ATTORNEYS Patented Oct. 28, 1941

2,260,905

UNITED STATES PATENT OFFICE 2,260,905

WIPER BLADE MOUNTING

Erwin C. Horton, Hamburg, N. Y., assignor to Trico Products Corporation, Buffalo, N. Y.

Application August 2, 1938, Serial No. 222,651

10 Claims. (Cl. 15—250)

This invention relates to a windshield cleaner and more particularly to the mounting of the wiper on its carrying arm.

When the windshield cleaner is not in use, the wiper carrying arm moves its wiper against the windshield molding for parking the same. As a rule the wiper will strike the molding with its inner end first and then ride on the molding while the arm is bringing the wiper into full facial contact therewith. This is primarily due to the fact that the wiper actuating shaft is mounted outside the plane of the molding and also because there is greater frictional resistance to the movement of the outer end portion on the glass.

The present invention has for its object to provide a mounting for the wiper in which the inner end of the wiper will be angularly displaced rearwardly from true registry with the arm during its operating stroke whereby the wiper will be normally disposed for substantially full facial contact with the molding when moved thereagainst for parking.

In the drawing

Fig. 1 is a front elevation in diagrammatic showing depicting the wiper angularly displaced in a rearward direction with respect to the arm during its operative stroke;

Fig. 2 is a side elevation of the wiper and its carrying arm, with the mounting being magnified for clarity;

Fig. 3 is a fragmentary plan view showing the attaching clip broken away; and

Fig. 4 is a detailed perspective of the pressure spring.

Referring more particularly to the drawing, the numeral 1 designates a wiper or wiping blade which is reciprocated on the windshield 2 by an actuating arm 3, the latter being driven by a power shaft 4 in a well known manner.

The outer end portion of the arm is preferably formed of a strap of resilient metal and its outer extremity is curved to form a seat 5. The outer end of the seat is upturned to form a stop 6 which is adapted to be inserted beneath a retaining strap 7 extending transversely of the wiper and forming a part of the back of the blade carried clip 8. The transverse retaining strap is curved lengthwise of the arm in conformity to the curvature of the seat 5 so as to nestingly engage the same and slide thereon as the wiper adjusts itself to the windshield surface.

The general design of the clip is U-shape in cross section with the sides thereof being secured in straddling relation over the back of the wiper by a rivet or other fastener 9. The clip may be shaped from sheet metal so that the retaining strap 7 is spaced outwardly from the back wall portions 10 and thereby forms an entranceway 11 for the introduction of the curved terminal of the arm. The curved arm terminal which may be generally referred to as a tongue 12, the seat 5 forming the outer surface thereof, is designed to pass entirely through the entranceway and the stop 6 will serve to prevent accidental displacement of the retaining strap from such tongue. The width of this tongue is less than the width of the entranceway so that the blade may tilt at the beginning of each stroke so as to drag across the glass surface.

For insuring the wiper moving squarely against the windshield molding, generally indicated by the numeral 12', it will be necessary for the inner end of the wiper being displaced rearwardly from underlying registry with the arm, as indicated at A in Fig. 1 so that when the wiper is being parked against either molding it will approach the latter in substantial parallelism therewith, as shown at B in Fig. 1, wherein the wiper is parked against the molding to the left of the actuating shaft, as viewed therein. To accomplish this displacement which is rearward with respect to the direction of movement, means are provided to increase the pressure in the wiping contact at the inner end of the wiper to a degree equal to or preferably greater than the wiping pressure at the outer end of the blade. According to the present showing a light leaf spring 13 is so positioned to bear downwardly on the inner end of the blade. This spring is formed with an anchoring terminal 14 upturned for fitting in a notch 15 formed in one of the back wall portions 10 for convenience in manufacture, the free end portion of the spring extending upwardly at 16 to lie flat against the under side of the tongue, preferably at a point in advance of the retaining strap 7 so as to facilitate introduction of the tongue. The spring may have a flat portion 17 for bearing firmly on the back of the channeled holder 18 of the wiper, as shown in Fig. 2, to more firmly support the spring. It will be noted that the free end portion of the spring is guided in its yielding movements between the leg extensions 19 which support the transverse retaining strap. This free terminal of the spring affords a leverage for reacting against the resilient urge of the actuating arm to press the inner end of the wiper more firmly against the glass.

To mount the arm the stop portion 6 is placed upon the free terminal of the spring to depress the latter, following which the tongue is slid beneath the retaining strap 7 in which position the spring is normally placed under a slight tension.

If desired, the attaching clip may be positioned on the blade closer to the outer end thereof to lengthen the surface contact of the inner end portion and thereby assist the spring in effecting the rearward displacement of such inner end portion.

The construction is simple, the several parts being readily formed by stamping operations. The spring is assembled with the clip on the blade without necessitating special independent securement. While the disclosure and description aforesaid are merely exemplary of the principles of the invention, it is obvious that various changes, reversal of parts, and modifications thereof may be resorted to without departing from the spirit or scope of the appended claims.

What is claimed is:

1. A wiping blade having a transverse retaining part with an entranceway for engaging an actuating arm beneath the retaining part, and a leaf spring having one end free of the blade for bearing outwardly against an engaged arm at one side of the retaining part and its opposite end anchored to the blade at the opposite side thereof to vary the pressure in the wiping contact at one end portion of the wiper with respect to that at the opposite end of the wiper.

2. A windshield cleaner comprising a wiping blade having a transverse retaining part with entranceways on opposite sides thereof, said part being curved lengthwise of the wiper, a carrying arm for the wiper having a terminal tongue engaging beneath the part and conforming in curvature thereto for nestingly receiving the same, the outer end of the tongue being deflected from the curvature thereof to form a retaining stop, and a leaf spring carried by the wiper and bearing outwardly on the arm at a point spaced from the retaining part.

3. A windshield cleaner comprising a wiping blade having a transverse retaining strap with an arm receiving entranceway, said retaining strap having straddling legs joined by a body part and fitting over the back of the wiper, and a leaf spring having an upturned terminal interlocking with the body part, the opposite terminal of the spring extending through the entranceway outwardly from the wiper at an angle and to one side of the retaining strap, to support an arm when the latter is engaged with the strap.

4. A wiper having a transverse strap extending over the back of the wiper in outwardly spaced relation thereto to receive an actuating arm therebeneath, and a leaf spring underlying the strap and anchored to the wiper with one terminal extending outwardly beneath the strap to one side thereof to resiliently support the arm when engaged with the strap.

5. A wiper blade having an attaching clip comprising a body with spaced legs straddling the back of the blade, means for securing the clip to the blade, said body having a recess between the legs and opening toward the back of the blade, and a leaf spring seated between the legs and having an upturned terminal engaging in the recess, the opposite terminal being deflected outwardly away from the blade for supporting engagement with an actuating arm, said body having a transversely extending part overlying the leaf spring for receiving the arm therebeneath, the deflected terminal of the spring extending beyond said part so as to be engaged and depressed by the arm when inserting the latter beneath said part.

6. In a windshield cleaner, a wiper member pivotally connected to an arm member for movement thereby, such pivotal connection permitting limited flopping movement of the wiper with respect to one plane of the arm when the wiper is moved across the windshield by the arm, and a leaf spring fixedly anchored at one end portion to one of said members and having its opposite end portion free and formed with a transversely flat face in full facial contact with a like flat face on said other member for resiliently maintaining the wiper normal to said plane of the arm, whereby flopping movement of the wiper will produce a torque in the spring tending to restore the wiper to its normal position.

7. In a windshield cleaner, a wiper member pivotally connected toward one end thereof to an arm member for movement thereby, such pivotal connection permitting limited flopping movement of the wiper with respect to the arm and swinging movement of the wiper about the longer end thereof when the wiper is moved across the windshield by the arm, and a leaf spring anchored at one end portion to one of said members and having its opposite end portion free and formed with a transversely flat face in full facial contact with a like face on said other member located toward the longer end of the wiper for resiliently maintaining the wiper normal to and in the plane of the arm with more pressure on the longer end, said faces permitting lateral sliding movement therebetween during said swinging movement whereby upon movement of the wiper by the arm said movements cooperate in producing a torque in the spring tending to restore the wiper to its position normal to and in the plane of the arm.

8. A wiper blade having a transverse arm engaging seat part, the seat being curved about a transverse axis and facing toward the wiping edge of the blade, an entranceway opening tangentially beneath the seat, a leaf-like spring member anchored at one end beneath the seat and having its opposite end extending freely through the entranceway and beyond the seat in a direction substantially tangential to the seat for being flexed away from the seat by an actuating arm part upon insertion of the latter through the entranceway into interengagement with the seat, said arm part being curved in substantial conformity to that of the seat for nesting interengagement therewith.

9. A wiper blade having a transverse arm engaging seat part, an entranceway to said seat, a wiper arm part insertable through said entranceway and interengageable with said seat, and a resilient member secured to one of said parts and freely extending through and beyond said entranceway for being flexed away from the seat by said other part by and during engagement of said parts.

10. In a wiper to wiper arm connection, an arcuate tongue formed on one part, a tongue receiving clip formed on the other part for embracingly receiving the tongue to connect the wiper for permitting flopping and tilting movements thereof with respect to the arm, and a leaf spring having one of its ends anchored to one of said parts to one side of said connection and having its free end extended across said connection and resiliently bearing on said other part, whereby said movements of said wiper are resiliently resisted by said spring which also causes one end of the wiper to be urged toward a surface to be wiped.

ERWIN C. HORTON.